United States Patent
Kane

(10) Patent No.: US 11,409,919 B2
(45) Date of Patent: Aug. 9, 2022

(54) UNCLONABLE RFID CHIP AND METHOD

(71) Applicant: SRI International, Menlo Park, CA (US)

(72) Inventor: Michael G. Kane, Princeton, NJ (US)

(73) Assignee: SRI International, Menlo Park, CA (US)

( * ) Notice: Subject to any disclaimer, the term of this patent is extended or adjusted under 35 U.S.C. 154(b) by 55 days.

(21) Appl. No.: 16/850,743

(22) Filed: Apr. 16, 2020

(65) Prior Publication Data

US 2020/0250350 A1 Aug. 6, 2020

Related U.S. Application Data

(62) Division of application No. 15/542,469, filed as application No. PCT/US2016/012339 on Jan. 6, 2016, now Pat. No. 10,664,625.

(Continued)

(51) Int. Cl.
*G06F 21/86* (2013.01)
*H04L 9/40* (2022.01)
(Continued)

(52) U.S. Cl.
CPC .............. *G06F 21/86* (2013.01); *G06F 21/73* (2013.01); *G06K 19/073* (2013.01); *G09C 1/00* (2013.01);
(Continued)

(58) Field of Classification Search
CPC ....... G06F 21/86; G06F 21/73; G06K 19/073; G09C 1/00; H04L 9/0866; H04L 63/0428; H04L 2209/12; H04L 2209/805
See application file for complete search history.

(56) References Cited

U.S. PATENT DOCUMENTS 6,047,068 A * 4/2000 Rhelimi ............... H04L 9/0866
380/46
7,015,823 B1 3/2006 Gillen et al.
(Continued)

FOREIGN PATENT DOCUMENTS

JP 5-343492 A 12/1993
JP 2006293721 A * 10/2006

OTHER PUBLICATIONS

Micah J. Green, "Nanotubes as polymers", Aug. 6, 2009, Elsevier Ltd, doi:10.1016/j.polymer.2009.07.044, 19 pages (Year: 2009).*
(Continued)

*Primary Examiner* — Carl G Colin
*Assistant Examiner* — Han Yang
(74) *Attorney, Agent, or Firm* — Rutan & Tucker, LLP

(57) ABSTRACT

A device includes a substrate, an array of metal pads on a first surface of the substrate, a carbon polymer composite covering the array of metal pads, the composite having variations that result in random resistance values between the metal pads usable as a random code. A method of manufacturing a secure device, including forming an array of metal pads on a dielet substrate, the dielet substrate containing at least one memory in which is stored an encryption key, and an RF communication section, covering the array of metal pads with a carbon polymer composite such that variations in the carbon concentration in the polymer forms a unique pattern of resistance, attaching the dielet substrate to a host component, receiving a request from a security server for a unique code determined by the unique pattern of resistance, and using the encryption key, encrypting and providing the unique code to the security server.

16 Claims, 6 Drawing Sheets

Related U.S. Application Data

(60) Provisional application No. 62/101,398, filed on Jan. 9, 2015.

(51) Int. Cl.
  *G09C 1/00* (2006.01)
  *H04L 9/08* (2006.01)
  *G06K 19/073* (2006.01)
  *G06F 21/73* (2013.01)

(52) U.S. Cl.
  CPC ........ *H04L 9/0866* (2013.01); *H04L 63/0428* (2013.01); *H04L 2209/12* (2013.01); *H04L 2209/805* (2013.01)

(56) References Cited

U.S. PATENT DOCUMENTS

| | | |
|---|---|---|
| 2005/0156318 A1 | 7/2005 | Douglas |
| 2007/0211511 A1* | 9/2007 | Kane ................. G11C 17/04 365/100 |
| 2010/0047564 A1 | 2/2010 | Kim et al. |
| 2010/0315153 A1* | 12/2010 | Oksanen ........... H01L 51/0558 327/535 |
| 2013/0232587 A1 | 9/2013 | Boday et al. |
| 2014/0042627 A1 | 2/2014 | Edelstein et al. |
| 2014/0144992 A1* | 5/2014 | Diorio ............... G06K 7/10297 235/488 |

OTHER PUBLICATIONS

International Search Report and Written Opinion, PCT/US16/12339, ISA:US, dated Sep. 13, 2016, 12 pp.

\* cited by examiner

UNCLONABLE RFID CHIP AND METHOD

RELATED APPLICATIONS

This application claims the benefit and claims priority as a divisional to U.S. patent application Ser. No. 15/542,469, titled "UNCLONABLE RFID CHIP AND METHOD," filed on Jul. 10, 2017 which is a § 371 U.S. National Stage of International Serial No. PCT/US2016/012339 filed Jan. 6, 2016, which claims priority to U.S. Provisional Patent Application No. 62/101,398, filed Jan. 9, 2015, the contents of which are hereby fully incorporated by reference herein.

GOVERNMENT FUNDING

This invention was made with Government support under contract no. HR0011-15-C-0010 awarded by the Defense Advanced Research Projects Agency (DARPA). The Government has certain rights in this invention.

BACKGROUND

Threats to defense electronic systems have increased from compromised or misrepresented components. Compromised components may consist of authentic parts that have been recycled or rejected, then passed off as acceptable components. In some instances, components may be de-soldered and re-used. Alternatively, they may be non-authentic, counterfeit components with characteristics that are inferior to authentic ones. In addition, a grave threat comes from counterfeit components in which a malicious adversary has deliberately included failure modes or hidden functionality such as a back door, a virus or a Trojan.

DETAILED DESCRIPTION OF THE EMBODIMENTS

Figure 1:
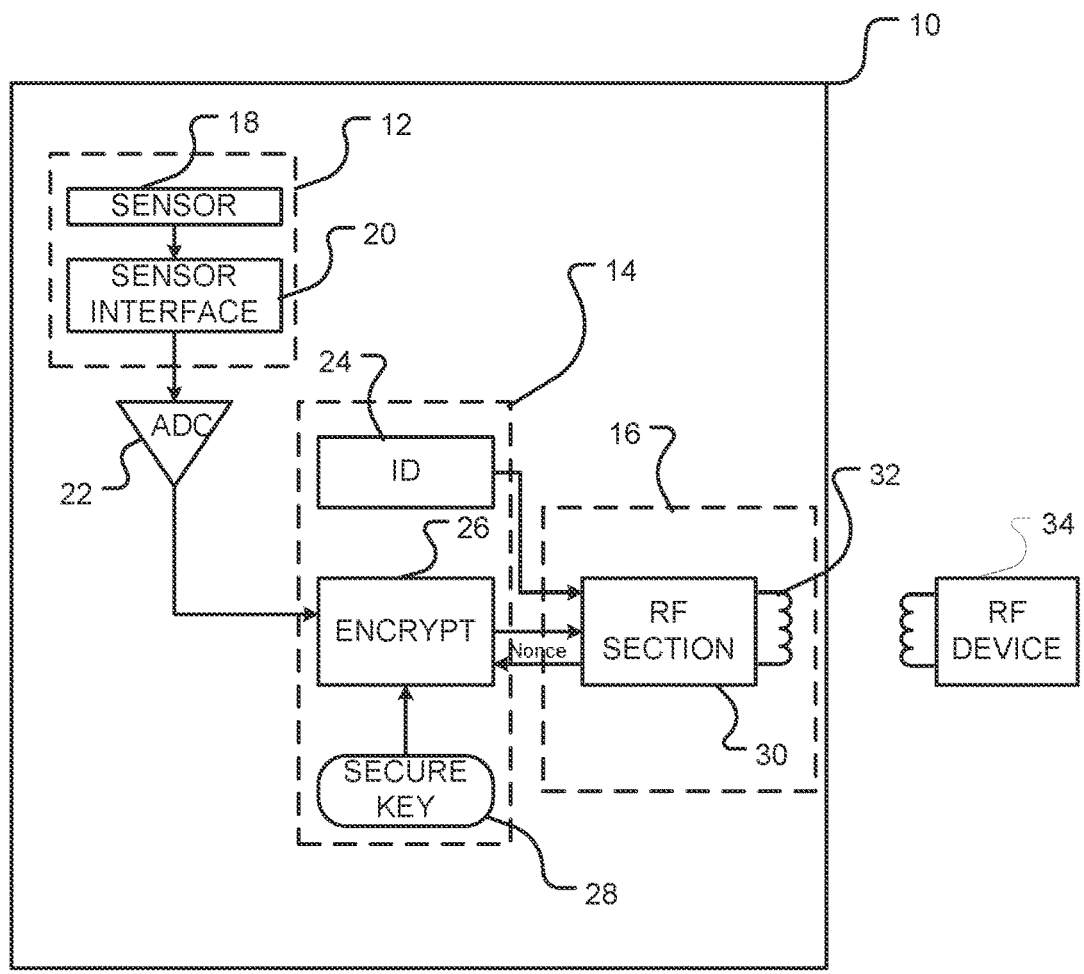
FIG. 1 shows an embodiment of a dielet architecture.

FIG. 1 shows an embodiment of a radio frequency identification (RFID) chip architecture. This RFID chip can be attached to a host component, such as a packaged IC chip, to provide secure and certain assurance of the host component's identity. The RFID chip is very small, typically having dimensions on the order of 100 micrometers squared, and is 50 micrometers or less thick. Because of the small size, and to differentiate the RFID chip from the host IC chip, the below discussion refers to the RFID chip as a dielet. Electrically attached to the dielet are non-resettable and unclonable, passive intrusion and temperature sensors.

In the embodiment of FIG. 1, the dielet 10 has three general parts, a passive sensor 12 with its interface and detection circuitry, digital logic 14 for encryption and control, and an RF section 16 that allows communication external to the dielet. As will be discussed in more detail with reference to FIGS. 2 and 3, the passive sensor 18 may sense intrusion, temperature or other parameters. The sensor interface 20 will detect the value or values of the sensor 18 and provide what will typically be an analog output signal. The analog-to-digital converter (ADC) 22 converts this to a readout having a pre-determined number of bits.

The digital logic 14 receives the digital readout at the encryption engine 26 which then encrypts the readout, typically using an encryption key 28. Once encrypted the data then passes to the RF interrogation system 16 that may consist of the dielet's RF communications circuit 30 and the dielet's on-chip antenna 32. This allows communication between the dielet and an external device communicating with the dielet through the encrypted values. The external device 34 may then communicate with an external security server or other storage to decrypt and verify the readout value.

Figure 2:
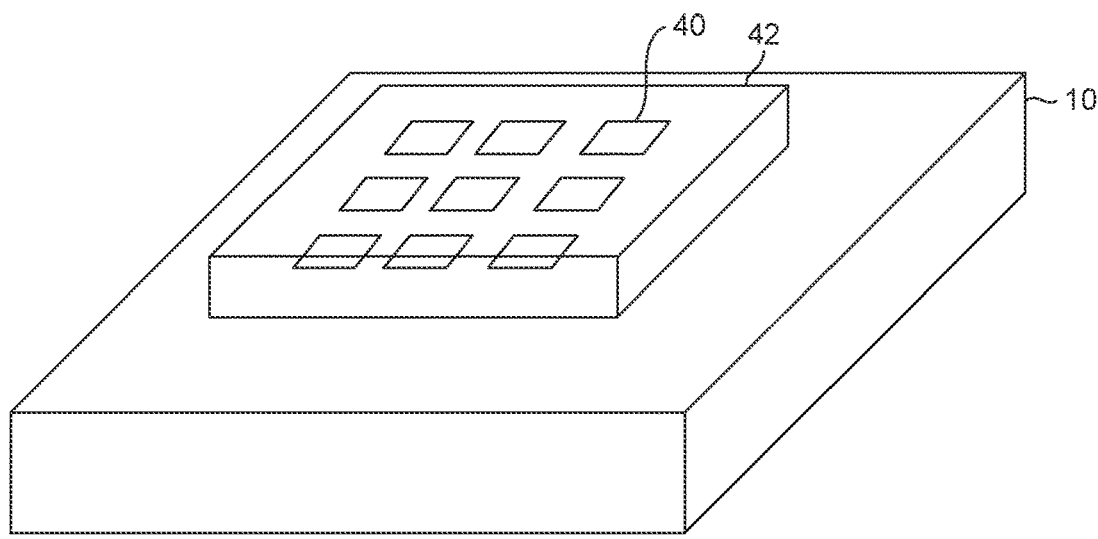
FIG. 2 shows an embodiment of a top surface of a dielet.

Each dielet has a unique sensor code. The code is not pre-programmed or otherwise determined in advance. The code results from a unique random resistance pattern formed by a resistive material that electrically contacts an array of metal pads on a surface of the dielet. FIG. 2 shows an embodiment of an array of metal pads such as 40 on a surface of the dielet 10. The resistive material consists of a thick layer of a carbon polymer composite 42 covering the pads, typically 100 to 300 um thick.

The carbon polymer composite will typically consist of a curable polymer material into which a carbon material is loaded or mixed. Typically, the amount of carbon varies randomly across the polymer layer. This creates a unique pattern of resistance between the metal pads of the array. This pattern of resistance is sensed and digitized, forming the dielet's unique sensor code. All of the manufacturing of the metal pads and the carbon polymer composite, as well as the deposition processes is compatible with typical CMOS (complementary metal oxide semiconductor) manufacturing processes. This allows the dielet to be produced in existing semiconductor fabs.

Figure 3:
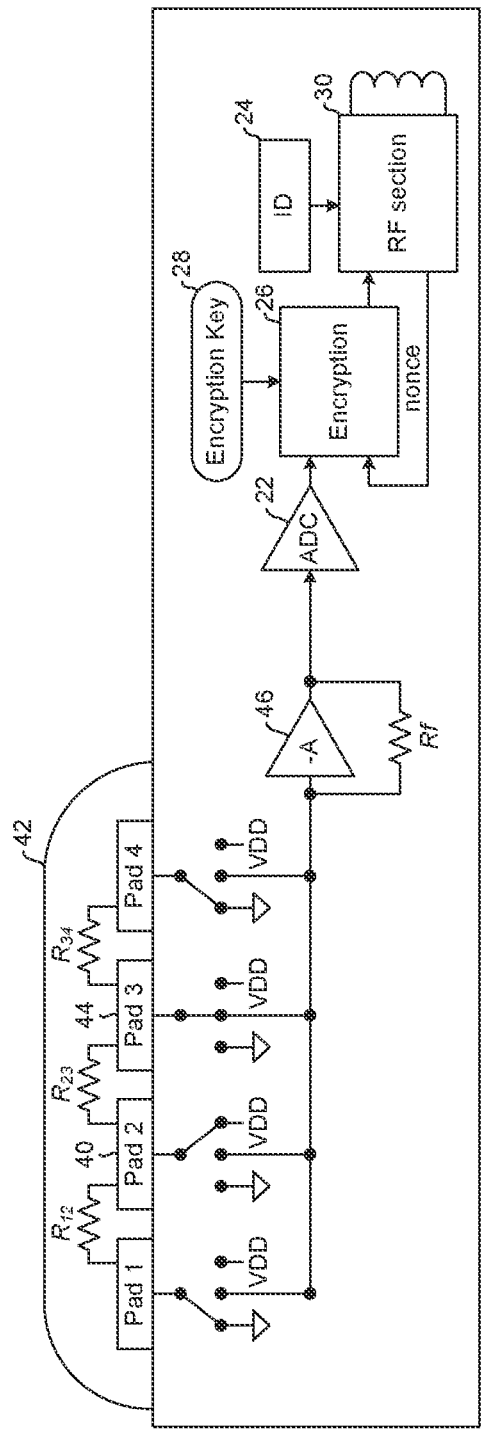
FIG. 3 shows a schematic of a dielet circuit.

As shown in FIG. 3, an amplifier such as 46, which may consist of a transimpedance current amplifier, detects the variations in resistance when a constant voltage is applied. The output of the amplifier is a voltage Vout, and Vout=Rf/Rij, where i and j are indexes for the particular resistance being sensed. For example, the resistance between pad 2, 40, and pad 3, 44, would be Rf/R23. These interpad resistances represent a unique fingerprint, or code, for that particular dielet. One should note that while this particular embodiment shows a linear array of pads, the array could take many forms, including 2D and 3D arrays. The number of measurements depends on the number of pads. For example, a square array of 9 pads (3×3) yields 12 distinct measurements, and 16 (4×4) pads yields 24.

FIG. 3 also shows a 64-bit identifier (ID) 24. The dielet transmits this ID in the clear and receives a nonce (number used once) from the server in return. The nonce is used in the encryption transaction in which the dielet transmits its unique code. This embodiment uses a 64-bit identifier, with the understanding that any length identifier can be used, and the identifier itself may be optional if the dielet can be otherwise identified.

The passive sensor consisting of the metal pad array and the carbon polymer composite provides intrusion and other tamper protection. The carbon polymer layer provides a unique code because it arises from random resistance variations in the conductive carbon percolation paths through the material. While some variations in the absolute resistance values may occur over the lifetime of the dielet due to a wide storage temperature range, such as the −55 to 125 degrees Celsius military-specified range, they should remain roughly constant. With proper allowance for measurement resolution, age of dielet and other considerations, and possibly with the use of error correction codes, the measured values can provide the basis for the dielet's unique code when digitized. Appropriate tuning of the threshold values provides a means to adjust for these factors.

In this manner, the carbon polymer composite serves as an intrusion sensor, since any attempt to remove the dielet from the host component to which it is attached will modify the code produced by the random resistance pattern. This may occur because the carbon polymer layer is damaged, cracked or otherwise altered during the process. This alteration of the resistance pattern indicates that the dielet was removed from the host component. It may also serve as a temperature sensor if the thermal cycles associated with desoldering and resoldering cycles result in changes of the resistance pattern that fall outside the threshold values.

Only the dielet can read the unique code. It cannot be directly read externally. It cannot be reverse engineered as any dismantling will destroy the code. The sensor interface that reads the code requires very little semiconductor area on the dielet, and easily scales to more advanced semiconductor technologies. No external power is required to maintain the code or its security.

Figure 4:
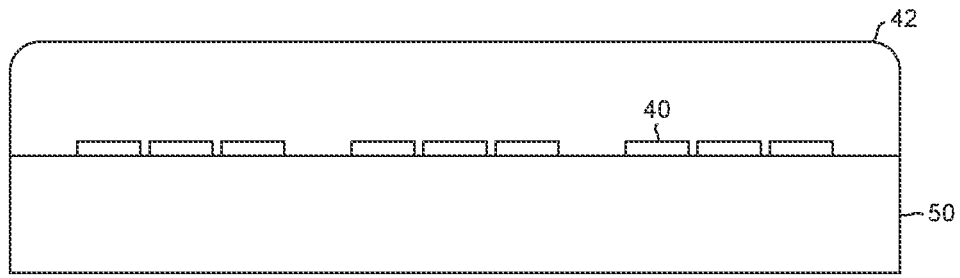
FIGS. 4-6 show an embodiment of a method thinning and separating dielets after integrated circuit (IC) fabrication.
Figure 5:
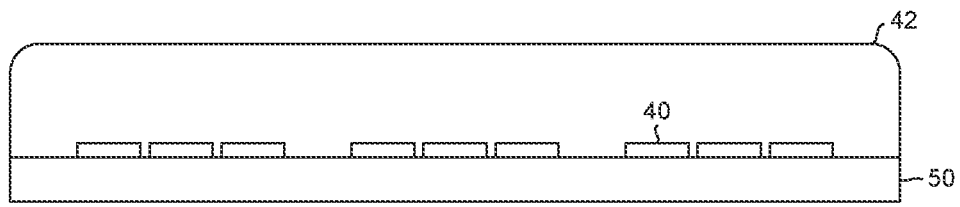
Figure 6:
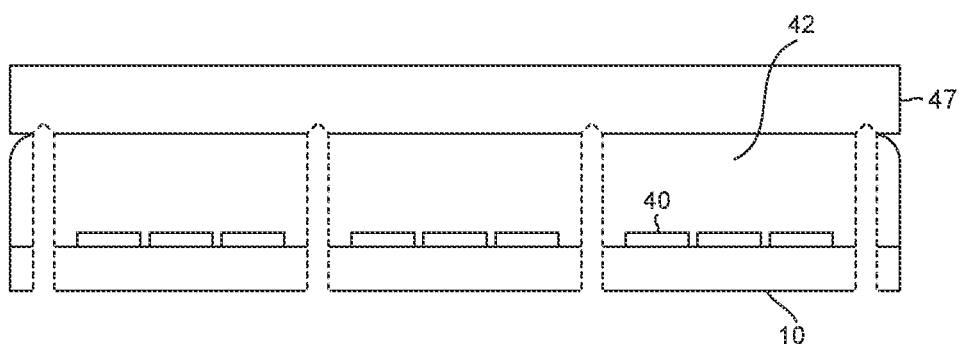

The dielet is intentionally manufactured as a fragile component by thinning after CMOS fabrication is complete. Its fragility is a desirable feature for security, since it makes the dielet very difficult to remove from the host component. However, forming the very thin (50 micrometers or less thick) dielets from a manufactured semiconductor IC wafer is very difficult, since such thin pieces of semiconductor are very fragile and break very easily, and after they are thinned they are very difficult to handle. FIGS. 4-6 show one embodiment of a method of forming the dielets from a manufactured semiconductor IC wafer in a way that renders them much less fragile.

FIG. 4 shows the dielets formed on a semiconductor wafer 50, prior to thinning and separation into individual dielets. The array of metal pads such as 40 reside on the surface of each dielet. In FIG. 4 the carbon polymer composite 42 has been applied to the entire semiconductor wafer surface to cover the pads after CMOS fabrication. The carbon composite polymer layer has a sufficient thickness to allow the semiconductor wafer to then be thinned from the back side, as shown in FIG. 5, without difficulty due to fragility, because the composite film plus the semiconductor wafer is much thicker than the thin semiconductor wafer alone. The amount of thinning performed on the wafer may need to account for any circuit components that extend down into the substrate from the top surface, such as by epitaxy or implantation. The amount of thinning may also need to be limited to avoid any weaknesses or defects introduced into the wafer by the thinning process, such as produced by strains on the material or miniscule cracks.

The polymer composite may be cured or partially cured, making the layer robust and able to withstand the strain of subsequent handling. This allows the relatively thin and fragile wafer to be separated into individual dielets, for example by sawing and dicing using a dicing film 47, without breaking the thin dielet substrates 10, as shown in FIG. 6.

Figure 7:
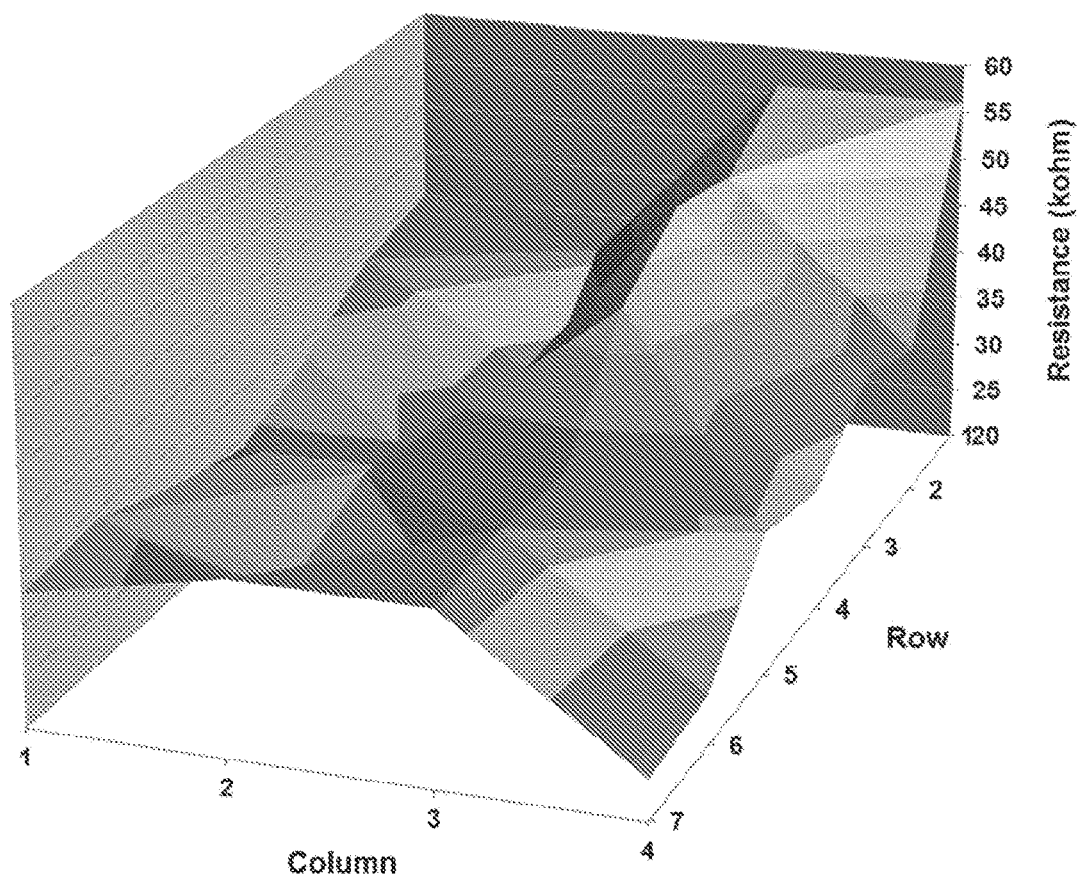
FIG. 7 shows a graphical representation of a 28-sample unique pattern of resistance of a carbon polymer composite over an array of metal pads.

With regard to temperature sensing, the dielet and code can provide irreversible detection of temperature cycles that may occur during de-soldering operations associated with production of counterfeit components. However, with proper formulation of the sensor material, ordinary wave soldering used in legitimate circuit board assembly does not damage the sensor code. As mentioned above, the codes may take many forms. FIG. 7 shows a 28-sample resistance fingerprint. This pattern was measured using 4 linear arrays of eight pads each, with 150 micrometer thick carbon-polymer composite applied over the tops of the pads. If a dielet having a unique code like this one undergoes intrusion, removal, or the temperatures associated with de-soldering, the code is altered or destroyed.

Figure 8:
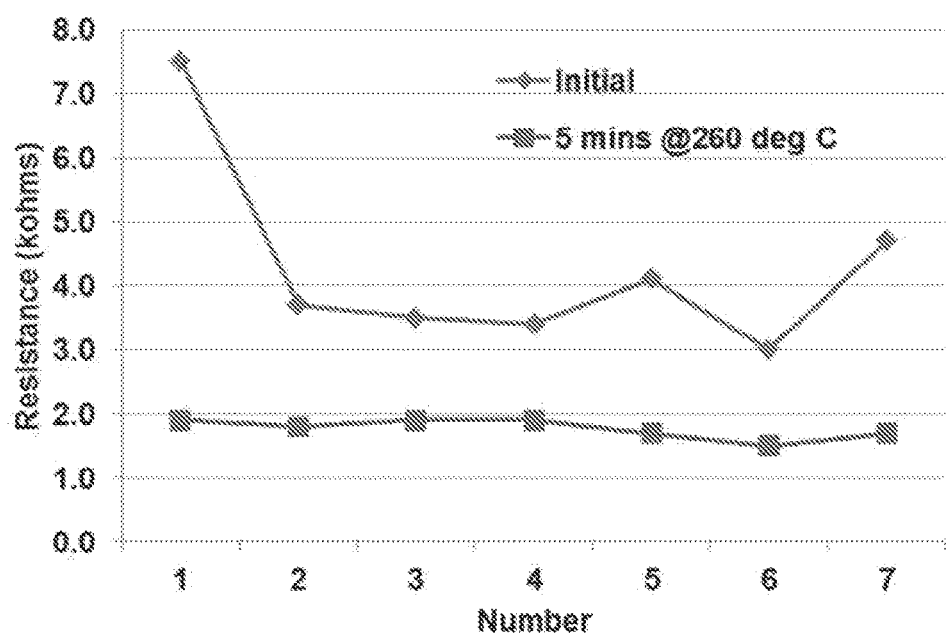
FIG. 8 shows an embodiment of a unique resistance pattern before and after a de-soldering temperature cycle.

FIG. 8 shows an example of a code being destroyed. The top line having diamond shaped data points represents a 7 value code obtained from a linear eight pad array covered with the carbon composite. The bottom line with the square shaped data points represents the code after being held at 260 degrees Celsius for 5 minutes, similar to a typical de-soldering operation. The unique pattern of the code has been completely erased. As mentioned above, experiments have shown that wave soldering, in which the material is exposed to molten solder for 10 seconds, does not change the resistance pattern. This allows the host component, which is the component that needs protection from counterfeiting or tampering, to have the dielet attached to it and to be soldered to a board without destroying the code.

Figure 9:
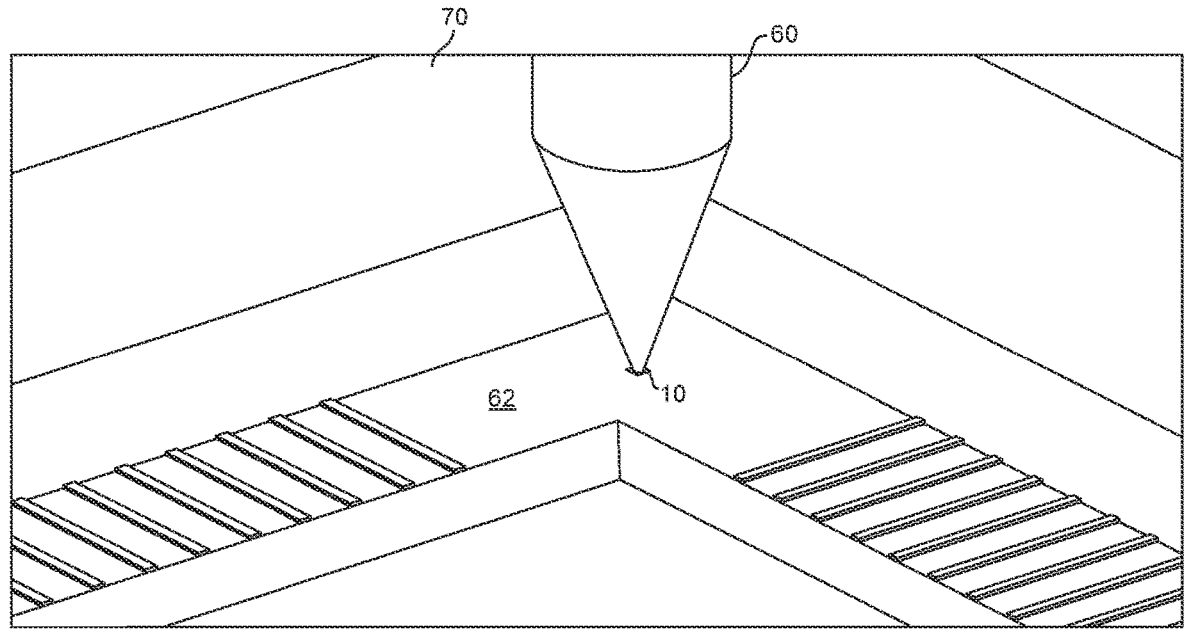
FIG. 9 shows an embodiment of a die bonding vacuum tool.
Figure 10:
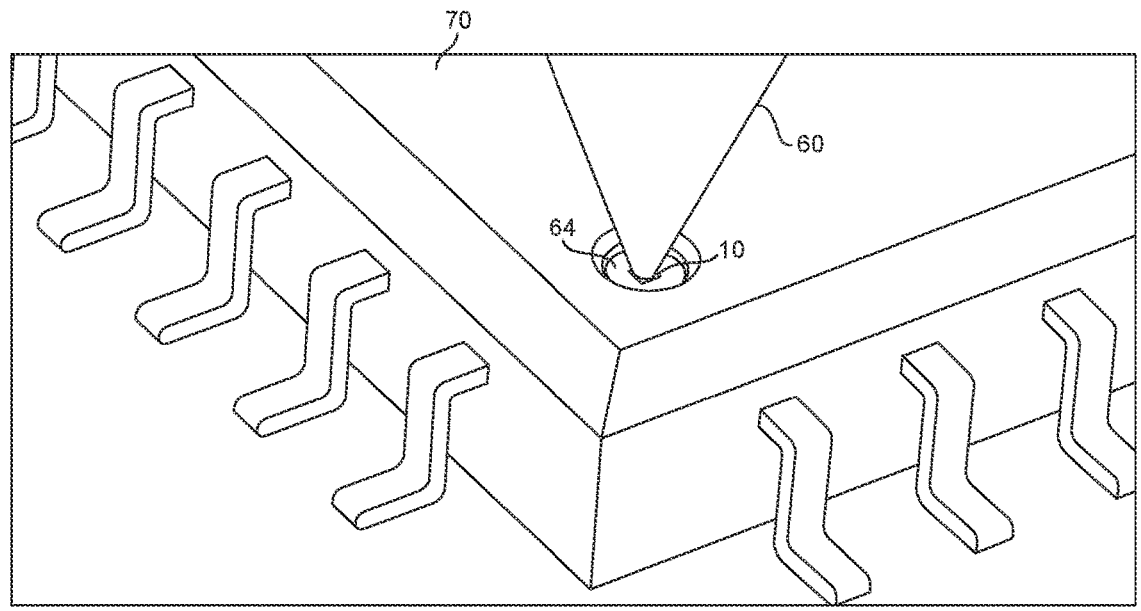
FIG. 10 shows an embodiment of a dielet being mounted on a package.

FIGS. 9 and 10 show an embodiment of a method of attaching the dielet to a host component. As shown in FIG. 9, the dielet 10 can be picked up off the dicing film by a conical tipped die bonding vacuum tool 60 and placed onto the bonding shelf 62 of a host component package 70. In this embodiment, the host component package consists of a ceramic package and is shown prior to attaching the host die. FIG. 10 shows an embodiment of the dielet 10 being inserted into a dimple 64 formed in the surface of a plastic molded quad flat pack (QFP).

The thick carbon polymer coating mitigates the strain on the fragile dielet by picking up of the dielet by a vacuum tip. In addition, the carbon polymer composite may assist in adhering the dielet to the package of the host component. The carbon polymer composite may consist of a carbon-loaded epoxy resin. Some embodiments may maintain their tackiness even when cured in the manufacturing process prior to sawing, in others the resin may only be partially cured. Once the dielet is attached with the carbon polymer composite, it will then typically receive an overcoating of a standard IC manufacturing epoxy resin.

Figure 11:
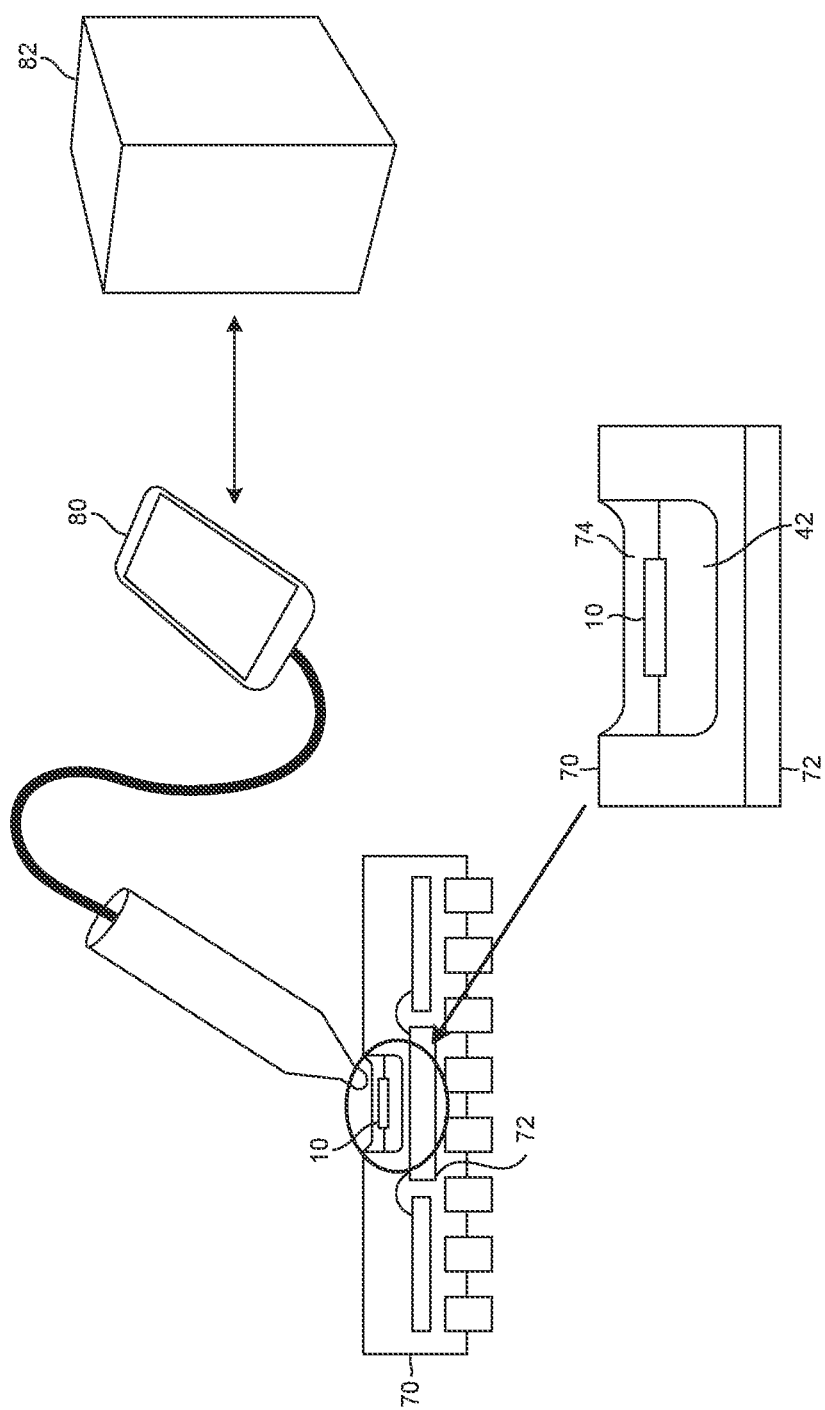
FIG. 11 shows an embodiment of a component security system.

One the dielet is attached to the host component, a security system as shown in FIG. 11 can verify and authenticate the host component using the unique code. As shown in FIG. 11, an RF probe can be attached to a mobile device, such as a smart phone 80, or a tablet computer. The mobile device can then communicate in a secure manner across a cellular or Internet connection, possibly through a VPN, with a security server 82. The security server maintains the list of codes and the associated components to allow the devices to be validated. As shown in the expanded view of the host component package, the dielet 10 resides in a dimple in the package 70 of the host die 72. The dielet is embedded in the host package with the carbon polymer composite 42 and an overcoating of standard IC packaging resin 74.

In this manner, a unique, randomly generated code based upon a physical characteristic of the dielet can be determined. The code is unclonable, unable to be reverse engineered, removed or tampered with because of the novel manner in which the code is generated and the dielets embedded in the host package.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A device, comprising:
   a substrate;
   an array of metal pads on a first surface of the substrate;
   a carbon polymer composite covering the array of metal pads, the composite having variations that result in a random resistance value between the metal pads;
   an analog-to-digital converter configured to produce a digital representation of the random resistance value formed between the metal pads to form a unique code to identify the device; and
   a memory configured to store an encryption key to encrypt the unique code, where an external device is required to decrypt a communication from the device to verify the unique code identifying the device because the unique code based on the random resistance value is not stored in the memory and therefore cannot be read directly externally from the memory or externally through access to the metal pads.

2. The device of claim 1, further comprising a host component having a package attached to the substrate.

3. The device of claim 2, wherein the carbon polymer composite forms an adhesive that assists in attaching the substrate to the package.

4. The device of claim 2, wherein the package comprises one of a quad flatpack or a preformed ceramic package.

5. The device of claim 2, wherein the substrate attaches to the package in a dimple formed in a packaging material.

6. The device of claim 1, wherein the carbon polymer composite comprises a carbon-loaded epoxy resin.

7. The device of claim 1, further comprising an amplifier on the substrate electrically connected to the array of metal pads.

8. The device of claim 1, further comprising a radio frequency communication section, where radio frequency communication section is electrically connected to the metal pads, where the radio frequency communication section is configured to allow communication between the device and the external device communicating with the device through encrypted communications.

9. A method for a device, comprising:
   fabricating a substrate;
   fabricating an array of metal pads on a first surface of the substrate;
   fabricating a carbon polymer composite covering the array of metal pads, the composite having variations that result in a random resistance value between the metal pads;
   fabricating an analog-to-digital converter to produce a digital representation of the random resistance value formed between the metal pads to form a unique code to identify the device; and
   fabricating a memory to store an encryption key to encrypt the unique code; where an external device is required to decrypt a communication from the device to verify the unique code identifying the device because the unique code based on the random resistance value is not stored in the memory and therefore cannot be read directly externally from the memory or externally through access to the metal pads.

10. The method of claim 9, further comprising attaching a host component having a package to the substrate.

11. The method of claim 10, wherein the carbon polymer composite forms an adhesive that assists in attaching the substrate to the package.

12. The method of claim 10, wherein the package comprises one of a quad flatpack or a preformed ceramic package.

13. The method of claim 10, wherein the substrate attaches to the package in a dimple formed in a packaging material.

14. The method of claim 9, wherein the carbon polymer composite comprises a carbon-loaded epoxy resin.

15. The method of claim 9, further comprising fabricating an amplifier on the substrate electrically connected to the array of metal pads.

16. The method of claim 9, further comprising fabricating a radio frequency communication section, where radio frequency communication section is electrically connected to the metal pads, where the radio frequency communication section is configured to allow communication between the device and the external device communicating with the device through encrypted communications.

* * * * *